United States Patent
Alpert et al.

(10) Patent No.: US 12,052,567 B2
(45) Date of Patent: Jul. 30, 2024

(54) DEVICE PROVISIONING

(71) Applicant: Texas Instruments Incorporated, Dallas, TX (US)

(72) Inventors: Yaron Alpert, Hod Hasharon (IL); Shmulik Elgavi, Netaim (IL); Barak Cherches, Ramat Ha'Kovesh (IL)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 0 days.

(21) Appl. No.: 18/356,742

(22) Filed: Jul. 21, 2023

(65) Prior Publication Data

US 2023/0362642 A1 Nov. 9, 2023

Related U.S. Application Data

(63) Continuation of application No. 17/125,554, filed on Dec. 17, 2020, now Pat. No. 11,751,050.

(51) Int. Cl.
*H04W 12/06* (2021.01)
*H04B 10/116* (2013.01)
(Continued)

(52) U.S. Cl.
CPC .......... *H04W 12/06* (2013.01); *H04B 10/116* (2013.01); *H04L 63/0428* (2013.01);
(Continued)

(58) Field of Classification Search
CPC ..... H04W 12/06; H04W 84/12; H04W 12/35; H04W 12/71; H04B 10/116;
(Continued)

(56) References Cited

U.S. PATENT DOCUMENTS 6,507,589 B1 * 1/2003 Ramasubramani ... H04L 67/563
370/465
8,494,502 B2 7/2013 Abel
(Continued)

FOREIGN PATENT DOCUMENTS

WO 2019194391 A1 10/2019

OTHER PUBLICATIONS

Aleksi Peltonen et al., Enterprise Security for the Internet of Things (IoT): Lightweight Bootstrapping with EAP-NOOB, Oct. 27, 2020, Sensors Article, pp. 11-14 (Year: 2020).*

(Continued)

*Primary Examiner* — Brandon J Miller
(74) *Attorney, Agent, or Firm* — Mandy Barsilai Fernandez; Frank D. Cimino

(57) ABSTRACT

A network device includes a wireless transceiver configured to establish a bi-directional communication channel with a network gateway. The network device also includes a visible light communication (VLC) interface configured to establish a visible light communication channel with a configurator for the network gateway. The network device further includes a controller configured to operate with the configurator to execute out-of-band (OOB) provisioning of the network device for the network gateway, wherein data communicated on the visible light communication channel includes a portion of information related to bootstrap provisioning the network device with the network gateway using the device provisioning protocol (DPP).

20 Claims, 7 Drawing Sheets

(51) Int. Cl.
*H04L 9/40* (2022.01)
*H04W 84/12* (2009.01)
*H04W 88/16* (2009.01)
*H05B 47/19* (2020.01)

(52) U.S. Cl.
CPC .......... *H04W 84/12* (2013.01); *H04W 88/16* (2013.01); *H05B 47/19* (2020.01)

(58) Field of Classification Search
CPC ..... H04L 63/0428; H04L 63/18; H05B 47/19; H05B 47/165
See application file for complete search history.

(56) References Cited

U.S. PATENT DOCUMENTS

| | | | |
|---|---|---|---|
| 9,390,277 | B2 | 7/2016 | Wang |
| 9,641,222 | B2 | 5/2017 | Yang |
| 10,313,116 | B2 * | 6/2019 | Barriga ................ H04L 63/061 |
| 11,057,108 | B1 | 7/2021 | Mondragon |
| 2018/0109381 | A1 | 4/2018 | Cammarota |
| 2018/0109418 | A1 * | 4/2018 | Cammarota .......... H04W 12/50 |
| 2019/0332774 | A1 | 10/2019 | Nix |
| 2019/0356482 | A1 | 11/2019 | Nix |
| 2020/0322047 | A1 | 10/2020 | Barnett |
| 2020/0382958 | A1 * | 12/2020 | Wang ................... H04W 12/06 |

OTHER PUBLICATIONS

Sampsa Latvala et al., Evaluation of Out-of-Band Channels for IoT Security, Sep. 3, 2019, SN Computer Science (2020) Original Research Paper, pp. 1-2, 5-12, 15 (Year: 2020).*

WiFi Alliance, Device Provisioning Protocol Specification Version 1.1, 2018, https://www.wi-fi.org/download.php?file=/sites/default/files/private/Device_Provisioning_Protocol_Specification_v1.1_1.pdf, pp. 20-26, 32-40, 45-53 (Year: 2018).

* cited by examiner

DEVICE PROVISIONING

CROSS-REFERENCE TO RELATED APPLICATIONS

This application is a continuation of U.S. patent application Ser. No. 17/125,554, filed Dec. 17, 2020, which application is hereby incorporated herein by reference.

TECHNICAL FIELD

This disclosure relates to device provisioning. More particularly, this disclosure relates to employing out of band (OOB) provisioning to provision a network device.

BACKGROUND

In telecommunication and information technology (IT), provisioning involves the process of preparing and equipping a network to allow it to provide new services to its users. Network provisioning or service mediation, mostly used in the telecommunication industry, refers to the provisioning of a customer's services to the network elements, which includes equipment connected in that network communication system. The provisioning process monitors access rights and privileges to ensure the security of network resources and user privacy. As a secondary responsibility, provisioning ensures compliance and minimizes the vulnerability of systems to penetration and abuse and provisioning reduces the amount of custom configuration involved.

The Internet of Things (IoT) is the internetworking of physical devices, vehicles (also referred to as "connected devices" and "smart devices"), buildings and other items that are embedded with electronics, software, sensors, actuators and network connectivity that enable these objects to collect and exchange data. The IoT allows objects to be sensed and/or controlled remotely across existing network infrastructure, creating opportunities for more direct integration of the physical world into computer-based systems, and resulting in improved efficiency, accuracy and economic benefit. When IoT is augmented with sensors and actuators, the technology becomes an instance of the more general class of cyber-physical systems, which also encompasses technologies such as smart grids, smart homes, intelligent transportation and smart cities. Each computing device employing IoT (referred herein as an "IoT device") is uniquely identifiable through an embedded computing system and is able to interoperate within the existing Internet infrastructure.

IoT devices include home appliances (e.g., refrigerator, washer/dryer, cooking appliances, etc.), control devices (e.g., television tuners, thermostats, tools, etc.), vehicles and location devices (e.g., key or pet tags). As the proliferation of smart devices continues, IoT devices will continue to expand to other categories of devices.

SUMMARY

A first example relates to a network device that includes a wireless transceiver configured to establish a bi-directional communication channel with a network gateway. The network device also includes a visible light communication (VLC) interface configured to establish a visible light communication channel with a configurator for the network gateway. The network device further includes a controller configured to operate with the configurator to execute out-of-band (OOB) provisioning of the network device for the network gateway, wherein data communicated on the visible light communication channel includes a portion of information related to bootstrap provisioning the network device with the network gateway using the device provisioning protocol (DPP).

A second example relates to a method for provisioning a network device. The method includes establishing a visible light communication channel with a configurator for a network gateway. The method also includes executing a portion of operations of OOB provisioning of the network device for the network gateway, wherein data communicated on the visible light communication channel includes a portion of information related to bootstrap provisioning the network device with the network gateway using the DPP. The method further includes establishing secure communication between the network device and the network gateway through a wireless transceiver based on the portion of information related to the bootstrap provisioning of the network device communicated through the visible light communication channel.

A third example relates to a configurator configured to communicate with a VLC interface to establish a visible light communication channel with a given one of a network device and a network gateway. The configurator also communicates with a wireless transceiver to establish bi-directional communication through a wireless medium with another one of the network device and the network gateway. The configurator further executes a portion of operations for OOB provisioning of the network device for a network gateway, wherein data communicated on the visible light communication channel includes information related to the bootstrap provisioning of the network device with the network gateway using the DPP to enable bi-directional wireless communication between the network device and the network gateway

DETAILED DESCRIPTION

This disclosure relates to provisioning a network device (e.g., an Internet of Things (IoT) device) using visible light communication (VLC). Device provisioning refers to the authentication of the network device for a network gateway (e.g., a Wi-Fi router) through a configurator. In some examples, the configurator operates as a trusted authentication source for the network gateway. In other examples, the configurator is not an authentication source for the network gateway, but provides information to the network device to identify a potential authentication source. In any such example, once the network device has been authenticated with the network gateway, the network device can communicate on a network upstream from the network gateway. Out of band (OOB) provisioning refers to the process of executing at least a portion of the provisioning through a different communication channel than the communication channel employed to facilitate communications between the network device and the network gateway. As some examples, a near field communication (NFC) channel is employed as an OOB communication channel to enable Wi-Fi communications. Other examples of OOB communication channels include Bluetooth Low Energy (BLE) communication channels, Zigbee communication channels and quick response (QR) codes. Usually, the transceivers needed to enable OOB communication are relatively expensive, such that OOB provisioning is cost prohibitive for low-end network devices.

The network device and the configurator disclosed in the present disclosure are configured to enable OOB provisioning with a visible light communication channel that is established through a VLC interface, such as a VLC transmitter (e.g., a light emitting diode (LED), a VLC receiver (e.g., a photodiode), both of which are relatively inexpensive and robust devices. In some examples, the visible light communication channel is unidirectional, wherein the network device is fabricated with only one of the VLC transmitter or the VLC receiver and the configurator is provided with the other of the VLC transmitter and the VLC receiver. In other examples, the visible light communication channel is bidirectional, such that the network device and the configurator are provided with both, the VLC transmitter and the VLC receiver. Accordingly, the network device is provided with a VLC interface to enable a visible light communication channel for provisioning the network device. Inclusion of the VLC interface obviates the need to include an expensive device to establish an OOB communication channel (e.g., a BLE transceiver, an NFC transceiver and/or a Zigbee transceiver) or a user interface on the network device to facilitate provisioning.

Figure 1:
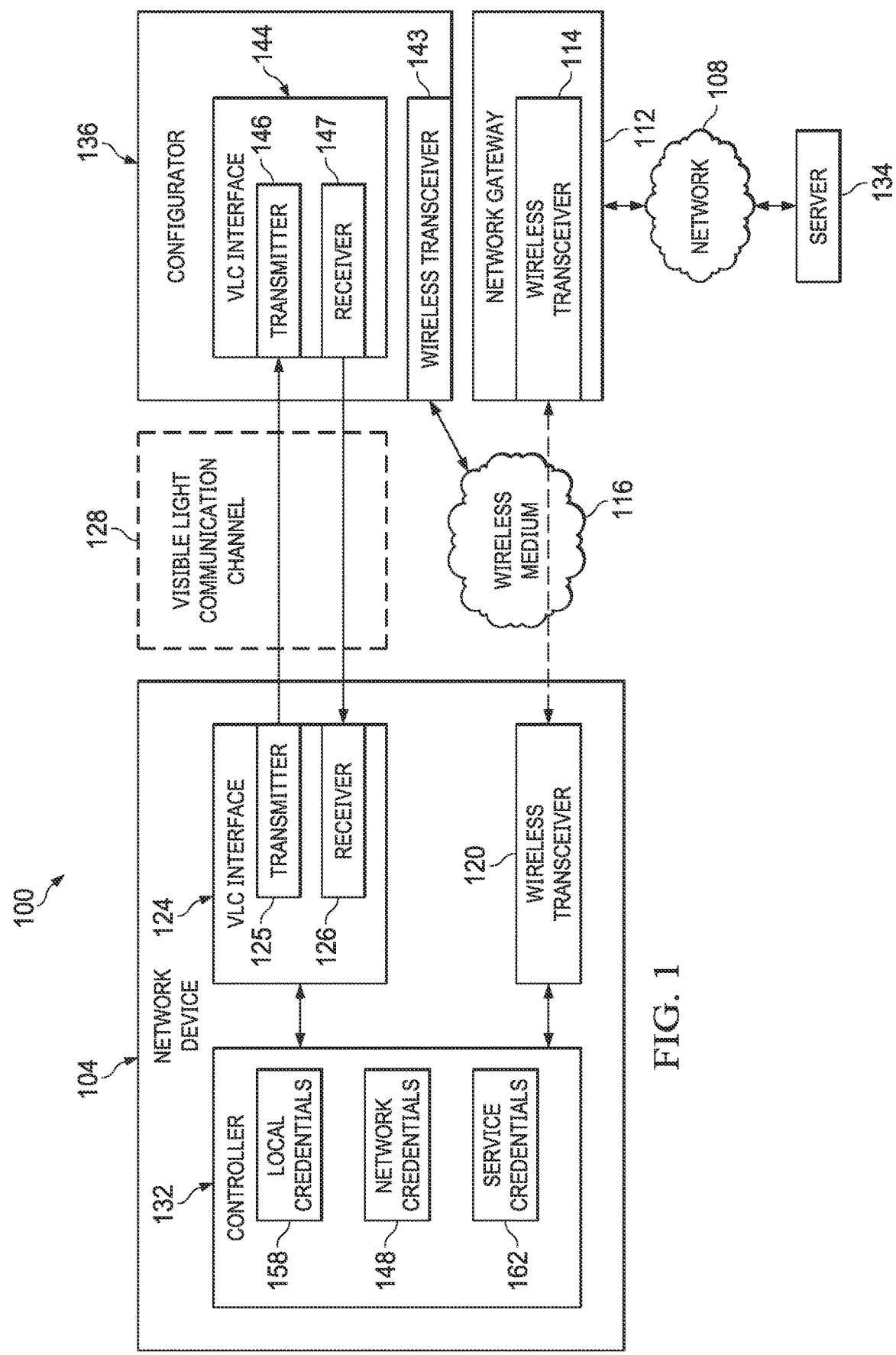
FIG. 1 illustrates an example of a system for provisioning a network device using a visible light communication channel.

FIG. 1 illustrates an example of a system 100 for provisioning a network device 104 with a visible light communication channel to enable communications on a network 108. The network 108 represents, in various examples, a public network (e.g., the Internet), a private network (e.g., a local area network) or a combination thereof (e.g., a virtual private network). A network gateway 112 gates access to the network 108.

Visible light communication (VLC) employs the visible light channel to communicate data at visible light frequencies between about 400 and about 800 terahertz (THz) (780-375 nanometers). VLC is a subset of optical wireless communication technologies. In various examples, VLC employs fluorescent lamps to transmit signals at 10 kilobits per second (kbit/s), or light emitting diodes (LEDs) to transmit signals up to about 500 Mbit/s over short distances (3 meters or less). VLC is defined in standards set forth in the Institute of Electrical and Electronics Engineers (IEEE) 802.15.7 standard.

The network gateway 112 includes a wireless transceiver 114 (e.g., a Wi-Fi transceiver) that is employable to communicate on a wireless medium 116. In some examples, the network gateway 112 controls data flow between the wireless medium 116 and a network 108. The wireless medium 116 is implemented, for example, as a wireless local area network (WLAN) or any other wireless communication technology. In some examples, the network gateway 112 is a hardware device that allows data to flow from one discrete network (e.g., the wireless medium 116) to another (e.g., the network 108). In some examples, the network gateway 112 is implemented as a residential gateway. In other examples, the network gateway 112 refers to a computer or computer application executing on a computing platform that is configured to perform the tasks of a gateway, such as a default gateway or router.

In some examples, the network device 104 is implemented as an IoT device, such as a remote control, a meter (e.g., a flow meter, an accelerometer), an appliance (e.g., a refrigerator, a washer/dryer), a control system (e.g., thermostat), etc. In some examples, the network device 104 is headless, indicating that the network device 104 is devoid of a user interface. That is, a headless network device operates without human interaction. The network device 104 includes a wireless transceiver 120 for communicating on the wireless medium 116. In some examples, the wireless medium 116 is a Wi-Fi network, such that the wireless transceiver 120 is implemented as a Wi-Fi transceiver that complies with wireless network protocols defined in the IEEE 802.11 family of standards.

The network device 104 also includes a VLC interface 124 that is employable to establish a visible light communication channel 128 with another entity. In some examples, the VLC interface 124 includes a transmitter 125 (e.g., an LED, a photodiode, etc.), and in other examples, the VLC interface 124 includes a receiver 126 (e.g., a photodetector or phototransistor). In still other examples, the VLC interface 124 represents multiple devices, such as both an LED and a photodetector. Stated differently, the VLC interface 124 represents a transmitter and/or a receiver.

The network device 104 includes a controller 132 that controls operations of the VLC interface 124 and the wireless transceiver 120. More particularly, the controller 132 communicates (transmits and/or receives) data to the VLC interface 124 that is communicated on the visible light communication channel 128. Additionally, the controller 132 communicates data to the wireless transceiver 120 that is transmitted or received on the wireless medium 116.

In some examples, the controller 132 includes embedded instructions (e.g., an application) for communicating with a server 134 on the network 108. For instance, in a situation where the network device 104 is an IoT device, the server 134 provides a computing platform for an IoT hub. In some examples, the network device 104 is fabricated without the information needed to interact with the server 134.

In the present example, device provisioning includes a process of supplying a device connected to the wireless medium 116 with credentials needed to enable the network gateway 112 to trust the authenticity the device sufficiently to allow the device to access the network 108 and to securely communicate with other nodes on the wireless medium 116, including but not limited to secure access to the network gateway 112. In the example illustrated, device provisioning involves providing the network device 104 with the credentials (e.g., a public key, a certificate, a username, a password, etc.).

The device provisioning of the network device 104 is executed as a bootstrapping operation, such as a bootstrapping provisioning operation. Bootstrapping, as used in the present examples, refers to a process that needs to execute before a resource-constrained network device, such as the network device 104 can operate properly. Thus, bootstrapping provisioning includes operations by which the network device 104 acquires keys, network identifiers (IDs), network setting/operation parameters (e.g., communication frequencies, access technologies, protocols, network bandwidth, etc.) certificates (e.g., public key certificates) and/or uniform resource locators (URLs) needed gain access to the network 108 and/or securely communicate on the wireless medium 116.

The system 100 includes a configurator 136 that that is included in the device provisioning process. As used herein, a configurator (including the configurator 136) is implemented as a logical entity with capabilities to enroll and provision devices for device-to-device communication or Infrastructure communication. In the example illustrated, the configurator 136 is implemented as a specialized hardware device, such as a controller with embedded instructions. In other examples, the configurator 136 is implemented as an application operating on a computing platform, such as a computing platform with a non-transitory memory and a processing unit. For instance, the configurator 136 is implemented as an application executing on a mobile computing device, such as a tablet computer or a smart phone.

In some examples, the configurator 136 includes a wireless transceiver 143 (e.g., a Wi-Fi transceiver) to communicate with the network gateway 112 through the wireless medium 116. In other examples, the configurator 136 does not have an active channel of communication with the network gateway 112. However, in either situation, the configurator 136 is authorized by the network gateway 112 to control a portion (or all) of the device provisioning for the network device 104.

The configurator 136 includes a VLC interface 144 that is employable to communicate with the network device 104 on the visible light communication channel 128. Similar to the VLC interface 124 of the network device 104, in various examples, the VLC interface 144 of the configurator 136 includes a transmitter 146 (e.g., an LED) and/or receiver 147 (e.g., a photodiode).

Conventionally, device provisioning is executed through communications on the wireless medium 116 and/or with user input. For instance, in a conventional approach a user could enter credentials, such as a set service identifier ID (SSID) and a key or password on a device (e.g., at a user interface) to cause the network gateway 112 to allow the device to communicate on the network 108. However, this approach is manually intensive, and requires the inclusion of a user interface.

In the example illustrated, the network device 104 is provisioned with OOB provisioning. OOB provisioning refers to a second channel of communication to execute the device provisioning. For instance, in the present situation, if the wireless medium 116 represents a first channel of communication (or a primary band), the visible light communication channel 128 represents the second communication channel (e.g., a secondary band). Accordingly, communications on the visible light communication channel 128 are out of band relative to communications on the wireless medium 116.

The network device 104 includes local credentials 158 stored in the controller 132. In various examples, the local credentials 158 includes a public key for the network device 104 and/or unique ID for the network device 104, such as a media access control (MAC) address for the wireless transceiver 120 of the network device 104, a certificate (e.g., a public key certificate), etc. The local credentials 158 are employable to uniquely identify and securely communicate with the network device 104. In examples where the local credentials 158 includes a public key, the controller 132 also stores a corresponding private key that is employable to decrypt information encrypted with the public key.

A device initiating the device provisioning protocol (DPP) authentication protocol is called an initiator, and a device that is responsive to the initiator is called a responder. In some examples, the network device 104 is the initiator and the configurator 140 is the responder. In other examples, the configurator 140 is the initiator and the network device 104 is the responder.

To provision the network device 104 for communications on the network 108 and/or to securely communicate with other devices on the wireless medium 116, the network device 104 needs to be provided network credentials 148 (e.g., an ID, such as an SSID, a certificate, a public key, a secret key and/or password for the network gateway 112) and/or provisioning credentials 162 (e.g., a URL for a service, a username and password, a public key of the service, etc.). Moreover, to initiate the device provisioning of the network device 104, the VLC interface 124 of the network device 104 and the VLC interface 144 of the configurator 140 are brought within close proximity (e.g., within 3 meters). In examples where the network credentials 148 includes a public key of the network gateway 112, the network device 104 employs the public key to encrypt messages that are decryptable by a corresponding private key of the network gateway 112. In some examples, the network credentials 148 and/or the provisioning credentials 162 are provided to the network device 104 through the visible light communication channel 128 in response to the network device 104 providing the local credentials 158 for the network device to the configurator 140 through the visible light communication channel. In some examples, the network credentials 148 and/or provisioning credentials 162 are provided to the network device 104 through the visible light communication channel 128 without the network device 104 providing the local credentials 158 for the network device to the configurator 140 through the visible light communication channel 128. In other examples, the network credentials 148 and/or the provisioning credentials 162 are provided to the network device 104 from the network gateway 112 through the wireless medium 116 in response to the network device 104 providing the local credentials 158 of the network device 104 to the configurator 140 through the visible light communication channel 128.

Accordingly, by implementing the system 100, a low cost VLC interface 124 is leveraged to implement device provisioning of the network device 104. In particular, the VLC interface 124 of the network device 104 and the VLC interface 144 of the configurator 140 are employed to provide the visible light communication channel 128 during secure OOB provisioning techniques to provision the network device. Moreover, as noted, in some examples, the visible light communication channel 128 is unidirectional and in other examples, the visible light communication channel 128 is bidirectional. However, in either such situation, the need for an expensive OOB device, such as a BLE transceiver, an NFC transceiver and/or a Zigbee transceiver is obviated without increasing a risk to security. Thus, the network device 104 is employable to implement secure low-cost devices, such as a headless IoT device.

FIGS. 2-5 illustrate timing diagrams of examples of a timing of a system 200 for executing methods for device provisioning using the OOB device provisioning with the DPP authentication protocol. For purposes of simplification of explanation, FIGS. 2-5 employ the same reference numbers to denote the same structures and functions. The system 200 is employable to implement the system 100 of FIG. 1.

The system 200 includes a network device 204 that is employable to implement the network device 104 of FIG. 1. The system 200 also includes a configurator 208 that is employable to implement the configurator 140 of FIG. 1. Furthermore, the system 200 includes a network gateway 212 that includes a Wi-Fi transceiver 214 that is employable to implement the network gateway 112 of FIG. 1. Each instance of the system 200 in FIGS. 2-5 implement the DDP authentication protocol to execute OOB provisioning to provision the network device 204 using bootstrapping. The network device 204 includes a Wi-Fi transceiver 216 that is employable to implement the wireless transceiver 120 of FIG. 1. In some examples, the configurator 208 also includes a Wi-Fi transceiver 220. The Wi-Fi transceiver 216 of the network device 204 and the Wi-Fi transceiver 220 of the configurator 208 are both employable to establish wireless communications with the Wi-Fi transceiver 214 of the network gateway 212 through a wireless medium 222, such as a WLAN or any wireless communication technology.

As noted, in the DDP a device that initiates provisioning is referred to as an initiator, and a device that is responsive to the initiator is referred to as a responder. In some examples, the network device 204 is the initiator and the configurator 208 is the responder. In other examples, the configurator 208 is the initiator and the network device 204 is the responder. The DPP authentication protocol dictates that the initiator obtain a bootstrapping key of the responder as part of a bootstrapping operation. In some examples, both devices in the DPP Authentication protocol obtain each other's bootstrapping keys in order to provide mutual authentication. After the authentication is completed, the configurator 208 provisions the network device 204 for device-to-device communication and/or for infrastructure communication, such as communication with devices on a network (e.g., the Internet) gated by the network gateway 212 and/or secure communications on the wireless medium 222. For example, as part of this provisioning, the configurator 208 enables the network device 204 to establish secure associations with other peers in the WLAN 222 and/or nodes on the network, such as a server (e.g., the server 134).

In the system 200, independent of whether the network device 204 or the configurator 208 initiates the DPP authentication protocol, the network device 204 trusts that the configurator 208 only issues credentials to devices that have been authenticated at least as strongly as the configurator 208 authenticated the network device 204, that the configurator 208 issues credentials for the same purpose as for that it issued to the network device 204, and that the configurator 208 has possession of a private signing key. The configurator 208 trusts that the public key included in local credentials issued to the network device 204 belongs to the network device 204.

Figure 2:
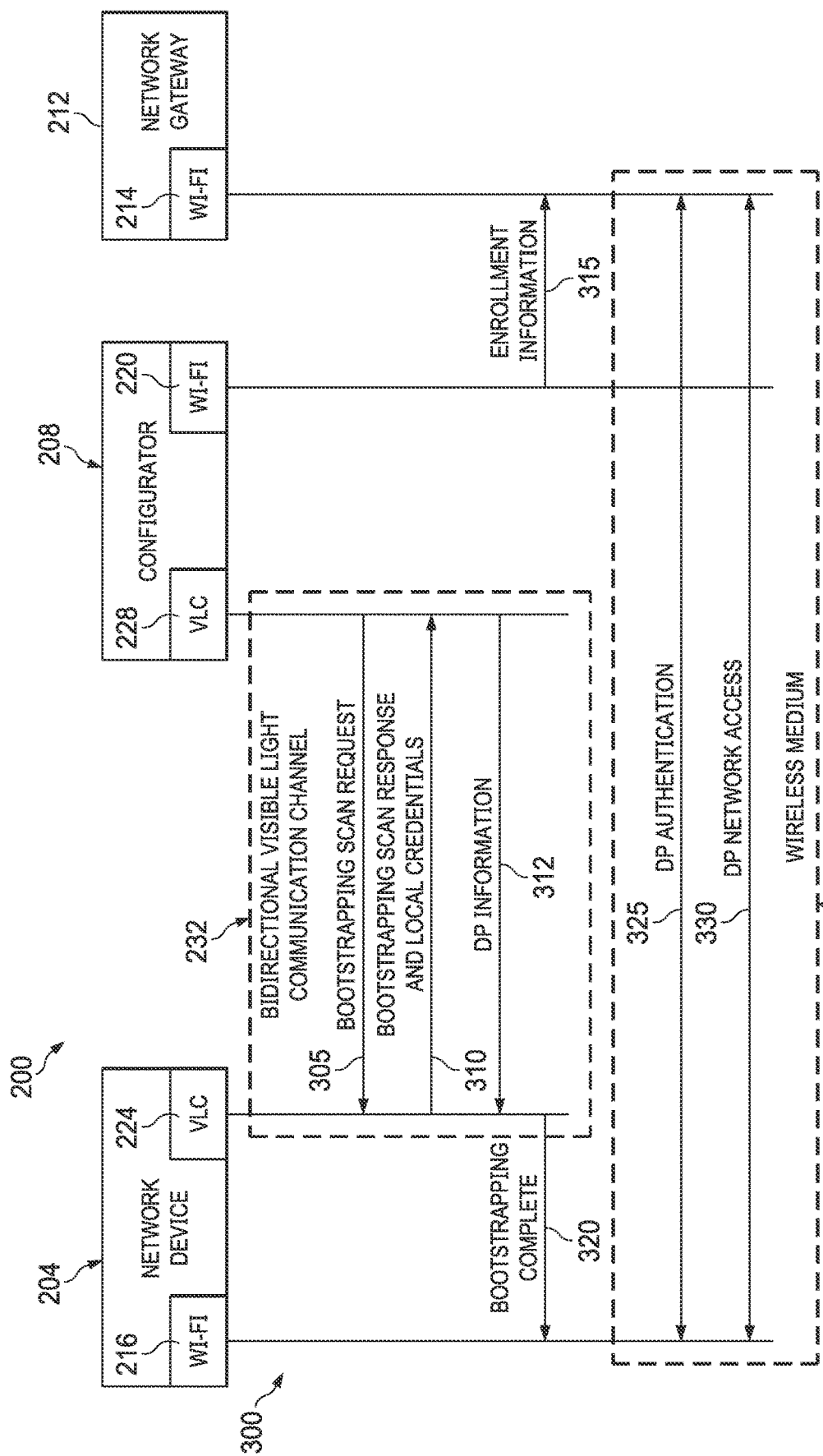
FIG. 2 illustrates a timing diagram of a system executing a method for provisioning a network device using a bidirectional visible light communication channel, wherein the network device responds to a request for initiating the provisioning.
Figure 3:
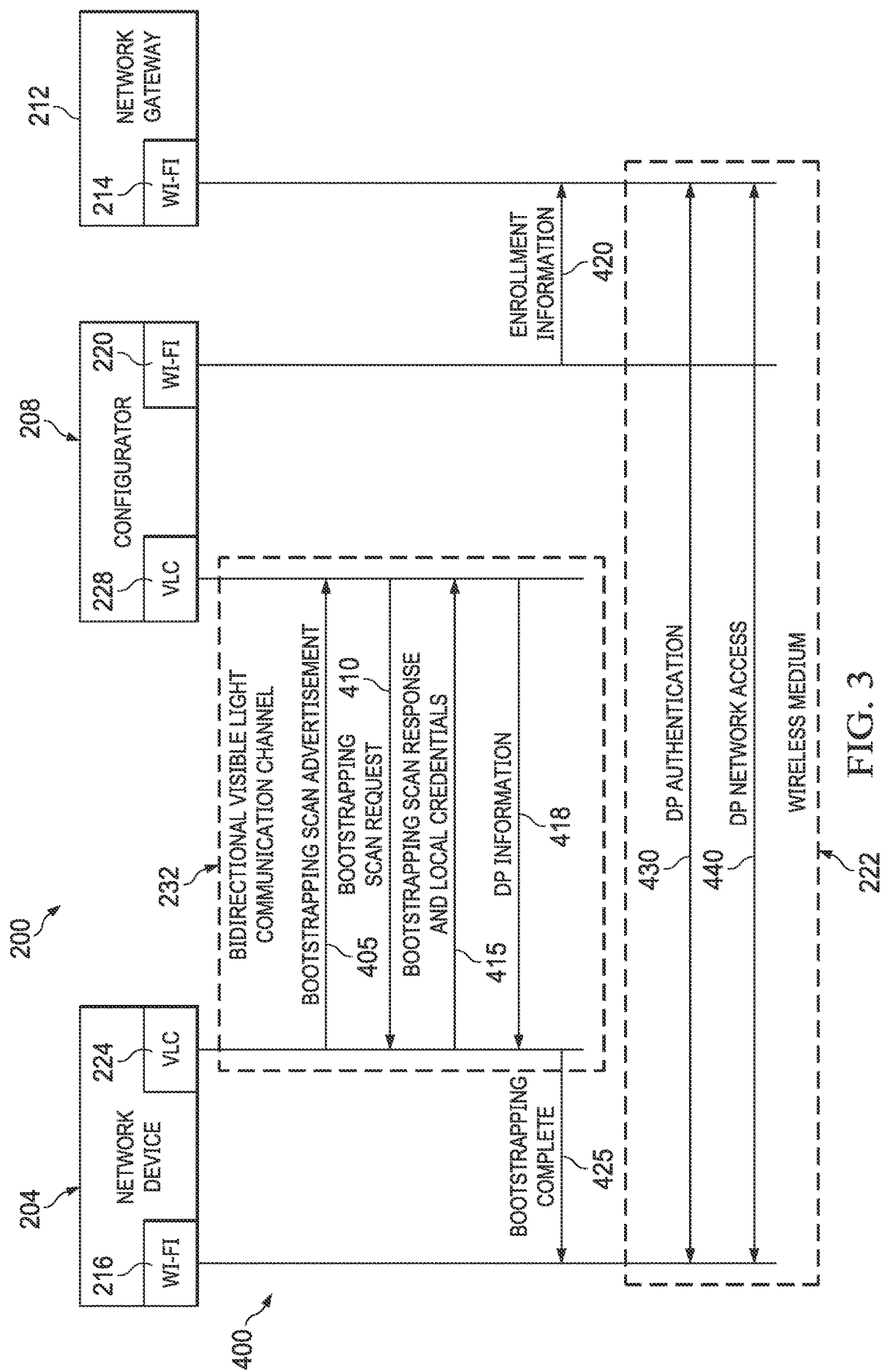
FIG. 3 illustrates a timing diagram of a system executing another method for provisioning a network device using a bidirectional visible light communication channel, wherein the network device initiates the provisioning.

FIGS. 2 and 3 illustrates a specific implementation of the system 200 where the network device 204 and the configurator 208 include VLCs 224 and 228, respectively. The VLC of the network device 204 and the VLC 228 of the configurator 208 each include a transmitter (e.g., a photodiode) and a receiver (e.g., a photodetector) that are employable in concert to establish a bidirectional visible light communication channel 232 (e.g., the visible light communication channel of FIG. 1) between the network device 204 and the configurator 208.

In FIG. 2, the system 200 implements a method 300. In the method 300 of FIG. 2, the configurator 208 is the initiator of the OOB provisioning for the network device 204 using the DPP authentication protocol. More particularly, at 305, the configurator 208 outputs a bootstrapping scan request on the bidirectional visible light communication channel 232 that is received at the VLC 224 of the network device 204. In at least one example, the bootstrapping scan request includes channel information for the bidirectional visible light communication channel 232 (a secondary channel) and a bootstrapping key for the configurator 208. For instance, in at least one example, the channel information indicates a transmission power and information characterizing a payload size for data communicated on the bidirectional visible light communication channel 232.

In response, at 310, the network device 204 (the responder), provides a bootstrapping scan response and local credentials (or some subset thereof) for the network device 204 on the bidirectional visible light communication channel 232 that is received at the VLC 228 of the configurator 208. The bootstrapping scan respond and local credentials includes, for example, a public key of the network device 204, and a unique ID, such as MAC address assigned to the Wi-Fi transceiver 216 of the network (e.g., included in the credentials of the network device), etc.

In some examples, at 312, the configurator 208 provides a portion of network credentials to the network device 204, such as an ID and/or a key for the network gateway 212. More particularly, in some examples, at 312 the configurator provides an SSID, a public key, a secret key and/or a certificate of the network gateway 212. Additionally, in response to the local credentials, at 315 the configurator 208 provides the network gateway 212 with enrollment information that includes the local credentials (e.g., the public key and MAC address of the Wi-Fi transceiver 216) for the network device 204. Moreover, as indicated at 320, bootstrapping operations are complete, and further communications are initiated on the wireless medium 222.

More particularly, at 325, communications through the wireless medium 222 include additional device provisioning authentication information. The additional device provisioning authentication information includes, a secret key (e.g., a symmetric key) for the network gateway 212, a certificate for the network gateway 212 etc. The device provisioning information provided at 312 and/or 325 is stored as network credentials on the network device 204. Moreover, in various examples, the device provisioning authentication data is provided to the network device from the network gateway 212, the configurator 208 or a combination thereof. At 330, the network device 204 leverages the device provisioning to enable network access, such that the network device 204 securely communicates with other nodes on the wireless medium 222 and/or a node on the network gated by the network gateway 212.

FIG. 3 illustrates the system 200 executing a method 400. In the method 400 of FIG. 3, the network device 204 is the initiator and the configurator 208 is the responder of the OOB provisioning for the network device 204 using the DPP authentication protocol. More particularly, at 405, the network device 204 provides a bootstrapping scan advertisement on the bidirectional visible light communication channel 232. The bootstrapping scan advertisement includes a bootstrapping key for the network device 204.

In response to receipt of the bootstrapping scan advertisement, at 410, the configurator 208 (the responder in the method 400) outputs a bootstrapping scan request on the bidirectional visible light communication channel 232 that is received at the VLC 224 of the network device 204. The bootstrapping scan request includes, for example, channel information for the bidirectional visible light communication channel 232 (a secondary channel). For instance, the channel information indicates a transmission power and information characterizing a payload size for data communicated on the bidirectional visible light communication channel 232.

In response to the bootstrapping scan request, at 415, the network device 204 (the initiator in the method 400), provides a bootstrapping scan response and local credentials for the network device 204 on the bidirectional visible light communication channel 232 that is received at the VLC 228 of the configurator 208. The bootstrapping scan respond and local credentials includes, for example, a public key of the network device 204, a unique ID, such as a MAC address assigned to the Wi-Fi transceiver 216 of the network (e.g., included in credentials of the network device), etc.

In some examples, at 418, the configurator 208 provides a portion of network credentials to the network device 204, such as an ID and/or a key of the network gateway 212. For instance, in some such examples, at 418, the configurator 208 provides an SSID, a public key, a secret key and/or a certificate of the network gateway 212. Additionally, in response to the local credentials for the network device 204, at 420, the configurator 208 provides the network gateway 212 with enrolment information that includes the local credentials (e.g., the public key and MAC address of the Wi-Fi transceiver 216) for the network device 204. Moreover, as indicated at 425, bootstrapping operations are complete, and further communications are initiated on the wireless medium 222.

More particularly, at 430, communications through the wireless medium 222 include additional device provisioning authentication information. The additional device provisioning authentication information includes, but is not limited to, a secret key (e.g., a symmetric key) for the network gateway 212, a certificate for the network gateway 212 etc. Moreover, in various examples, the additional device provisioning authentication data is provided to the network device from the network gateway 212, the configurator 208 or a combination thereof. Device provisioning information provided at 418 and/or 430 is stored in the network device 204 as network credentials. At 440, the network device 204 leverages the device provisioning to enable network access, such that the network device 204 securely communicates with other nodes on the wireless medium 222 and/or a node on the network gated by the network gateway 212.

Figure 4:
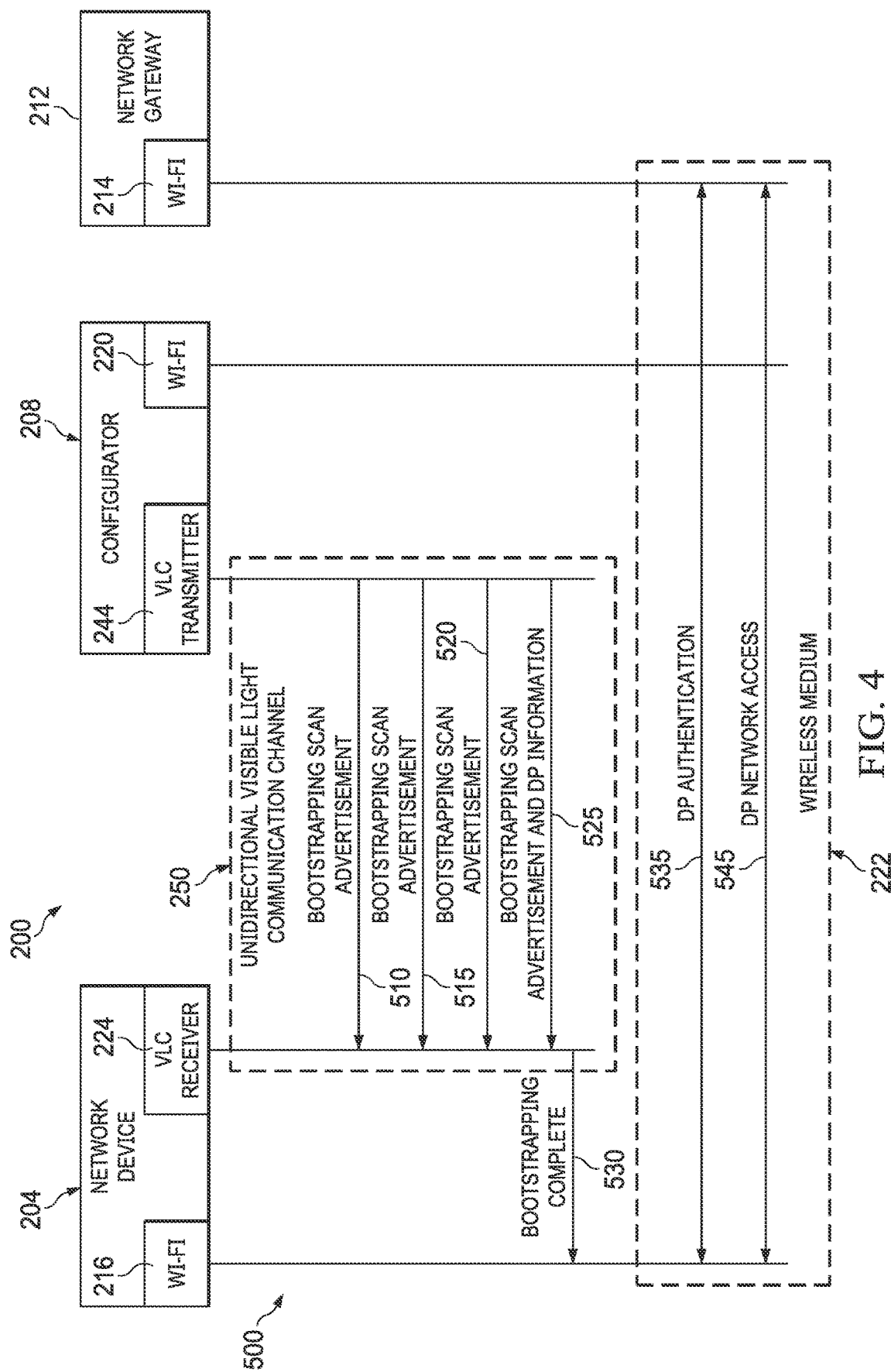
FIG. 4 illustrates a timing diagram of a system executing a method for provisioning a network device using a unidirectional visible light communication channel, wherein the network device responds to a request for initiating the provisioning.

FIG. 4 illustrates a specific implementation of the system 200 where the network device 204 includes a VLC receiver 240 (e.g., a photodiode) and the configurator 208 includes a VLC transmitter 244 (e.g., an LED). Accordingly, the VLC transmitter 244 of the configurator 208 and the VLC receiver 240 of the network device 204 are employable to establish a unidirectional visible light communication channel 250.

In FIG. 4, the system 200 implements a method 500. In the method 500 of FIG. 4, the network device 204 is the responder and the configurator 208 is the initiator of the OOB provisioning for the network device 204 using the DPP authentication protocol. More particularly, at 510, 515 and 520, the configurator 208 provides a bootstrapping scan advertisement on the unidirectional visible light communication channel 250. In the method 500, there are three such bootstrapping scan advertisements, but in other examples, there could be more or less bootstrapping scan advertisements. The bootstrapping scan advertisement at 510, 515 and 520 includes a bootstrapping key for the configurator 208 and channel information for the unidirectional visible light communication channel 250.

At 525, the configurator 208 provides a bootstrapping scan advertisement and device provisioning information. In the method 500, the device provisioning information includes an ID and/or key, such a SSID, a public key, a secret key and/or a certificate for the network gateway 212. As indicated at 530, bootstrapping of the network device 204 is complete and further communications are initiated on the wireless medium 222.

More particularly, at 535, communications through the wireless medium 222 include device provisioning authentication information. The additional device provisioning authentication information includes, but is not limited a secret key (e.g., a symmetric key) for the network gateway 212, a certificate for the network gateway 212, etc. Moreover, in various examples, the device provisioning authentication data is provided to the network device 204 from the network gateway 212, the configurator 208 or a combination thereof. The device provisioning information provided to the network device 204 at 525 and/or at 535 is stored in the network device 204 as network credentials. At 545, the network device 204 leverages the device provisioning to enable network access, such that the network device 204 securely communicates with other nodes on the wireless medium 222 and/or a node on the network gated by the network gateway 212.

Figure 5:
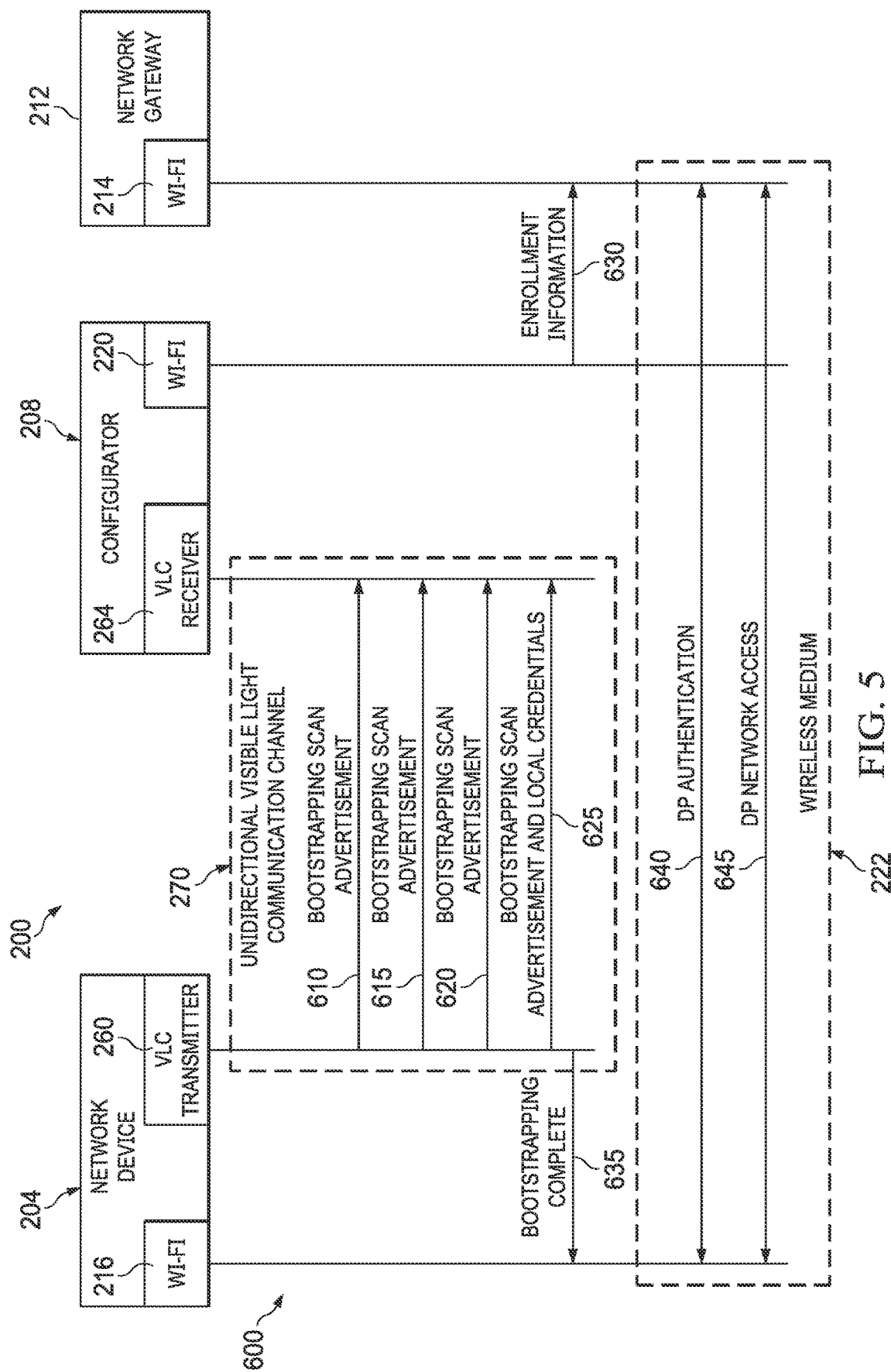
FIG. 5 illustrates a timing diagram of a system executing a method for provisioning a network device using a unidirectional visible light communication channel, wherein the network device initiates the provisioning.

FIG. 5 illustrates a specific implementation of the system 200 where the network device 204 includes a VLC transmitter 260 (e.g., an LED) and the configurator 208 includes a VLC receiver 264 (e.g., a photodiode). Accordingly, the VLC transmitter 244 of the network device 204 and the VLC receiver 264 of the configurator 208 are employable to establish a unidirectional visible light communication channel 270.

In FIG. 5, the system 200 implements a method 600. In the method 600 of FIG. 5, the network device 204 is the initiator and the configurator 208 is the responder of the OOB provisioning for the network device 204 using the DPP authentication protocol. More particularly, at 610, 615 and 620, the network device 204 provides a bootstrapping scan advertisement on the unidirectional visible light communication channel 270. In the method 600, there are three such bootstrapping scan advertisements, but in other examples, there could be more or less bootstrapping scan advertisements. The bootstrapping scan advertisement at 610, 615 and 620 include a bootstrapping key for the network device 204 and channel information for the unidirectional visible light communication channel 270.

At 625, the network device 204 provides a bootstrapping scan advertisement and local credentials for the network device 204. In the method 600, the local credentials includes a public key for the network device 204 and a unique ID, such as a MAC address of the Wi-Fi transceiver 216 and/or other portions of the local credentials for the network device 204. At 630, in response to the device provisioning information, the configurator 208 provides enrollment information for the network device 204 to the network gateway 212. The enrollment information includes, but is not limited to the local credentials for the network device 204. As indicated at 635, bootstrapping of the network device 204 is complete and further communications are initiated on the wireless medium 222.

More particularly, at 640, communications through the wireless medium 222 include device provisioning authentication information. The device provisioning authentication information includes, but is not limited to an SSID of the network gateway 212, public key, a secret key (e.g., a symmetric key) for the network gateway 212, a certificate for the network gateway 212, etc. Moreover, in various examples, the device provisioning authentication data is provided to the network device 204 from the network gateway 212, the configurator 208 or a combination thereof. At 645, the network device 204 leverages the device provisioning to enable network access, such that the network device 204 securely communicates with other nodes on the wireless medium 222 and/or a node on the network gated by the network gateway 212.

As demonstrated in FIGS. 2-5, the system 200 is adaptable to provision the network device 204 in a number of different ways. In particular, in some examples, as illustrated in FIGS. 2-3, the network device 204 and the configurator 208 communicate over a bidirectional visible light communication channel. In other examples, as illustrated in FIGS. 4-5 the network device 204 and the configurator 208 communicate through a unidirectional visible light communication channel. However, in each such example illustrated and described, there is no need to include a relatively expensive BLE transceiver, an NFC transceiver and/or a Zigbee transceiver. Additionally, in some examples the network device 204 is headless (devoid of a user interface). That is, in some examples, the network device 204 is controlled completely through automated software, such that the need for expensive (and potentially less secure) user interface is obviated.

Figure 6:
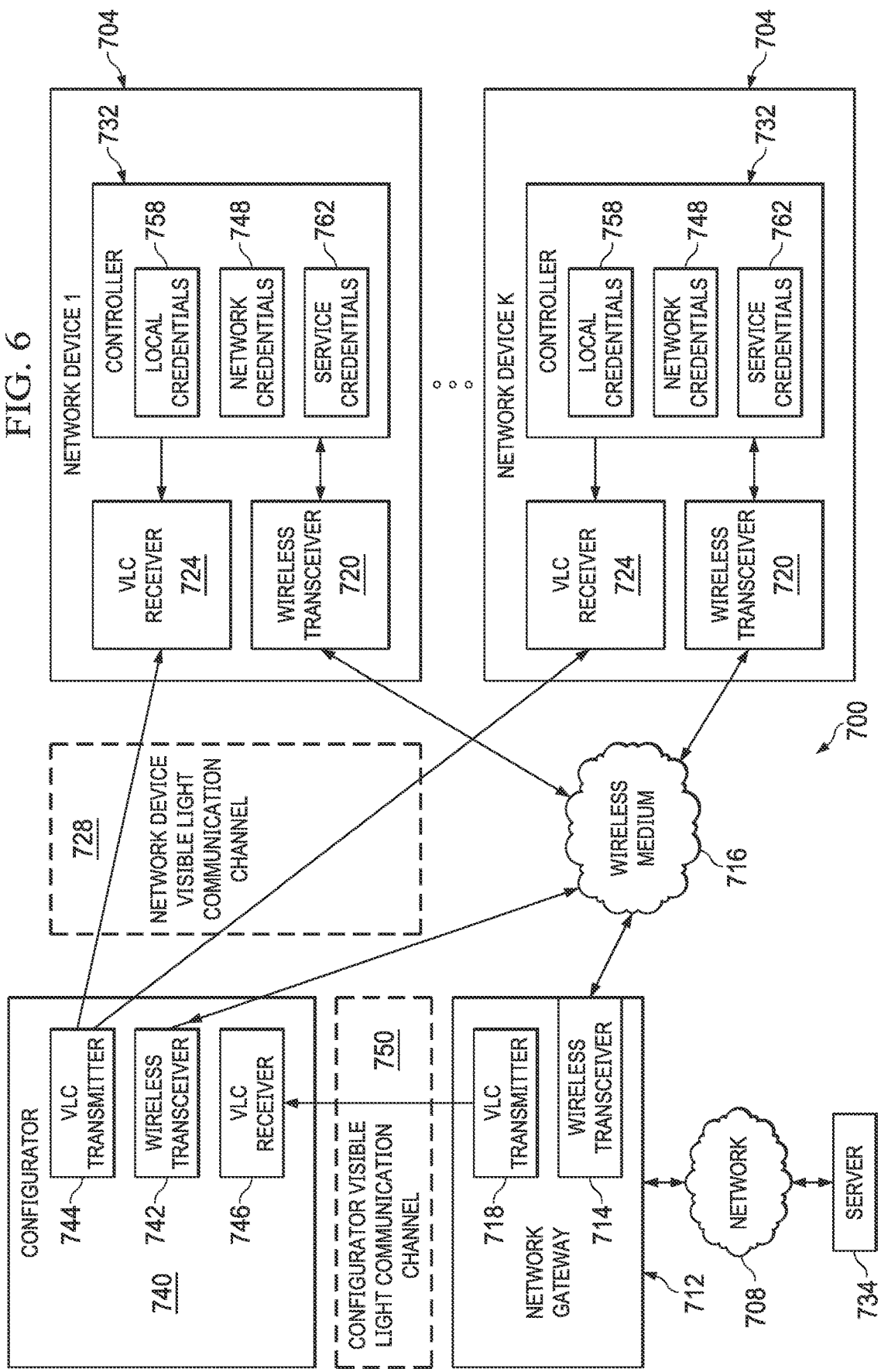
FIG. 6 illustrates an example of a system for provisioning multiple network devices contemporaneously using a visible light communication channel.

FIG. 6 illustrates an example of a system 700 for provisioning K number of network devices 704 with a visible light channel to communicate on a network 708, where K is an integer greater than or equal to two. The network 708 represents, in various examples, a public network (e.g., the Internet), a private network (e.g., a local area network) or a combination thereof (e.g., virtual private network). A network gateway 712 controls access to the network 708. The system 700 is employable to implement the system 100 of FIG. 1 and/or the system 200 of FIGS. 2-4.

The network gateway 712 includes a wireless transceiver 714 for communicating on a wireless medium 716. The network gateway 712 is employable to control data flow between the wireless medium 716 and the network 708. The wireless medium 716 is implemented as a WLAN or any wireless communication technology. Additionally, in some examples, the network gateway 712 includes a VLC transmitter 718 for providing data through a visible light communication channel. The network gateway 712 is employable to implement the network gateway 112 of FIG. 1 and/or the network gateway 212 of FIGS. 2-4.

The K number of network devices 704 are each employable to implement instances of the network device 104 of FIG. 1 and/or the network device 204 of FIGS. 2-4. In some examples, the K number of network devices 704 are implemented as IoT devices. In some examples, the network devices 704 are headless, indicating that the network devices 704 are devoid of a user interface. That is, a headless network device operates without human interaction. The network devices 704 include a wireless transceiver 720 for communicating on the wireless medium 716. In some examples, the wireless medium 716 is a Wi-Fi network, such that the wireless transceiver 720 is implemented as a Wi-Fi transceiver that complies with wireless network protocols defined in the IEEE 802.11 family of standards.

In some examples, the network devices 704 also includes a VLC receiver 724 that is employable to receive communication through a network device visible light communication channel 728 transmitted from another entity. In some examples, the VLC receiver 724 is implemented as a photodetector. In other examples, the VLC receiver 724 is omitted.

The K number of network devices 704 includes a controller 732 that controls operations of the VLC receiver 724 and the wireless transceiver 720. More particularly, in some examples the controller 732 communicates (receives) data transmitted to the VLC receiver 724 that is communicated on the network device visible light communication channel 728. Additionally, the controller 732 communicates data to the wireless transceiver 720 that is transmitted or received on the wireless medium 716.

In some examples, the controller 732 includes embedded instructions (e.g., an application) for communicating with a server 734 on the network 708. For instance, in a situation where the K number of network devices 704 are IoT devices, the server 734 provides a computing platform for an IoT hub. In some examples, the K number of network devices 704 are fabricated without the information needed to interact with the server 734.

In some examples, the device provisioning of the K number of network devices 704 is executed as a bootstrapping operation, such as using the DDP authentication protocol. The device provisioning characterizes operations by which the K number of network devices 704 acquires keys, network IDs, certificates and/or URLs needed to reach the server 734.

The system 700 includes a configurator 740 that is included in the device provisioning process. In some examples, the configurator 740 is implemented as a specialized hardware device. In other examples, the configurator 740 is implemented as an application operating on a computing platform, such as an application executing on a mobile device (e.g., a smart phone or a tablet computer). The configurator 740 is employable to implement the configurator 140 of FIG. 1 and/or the configurator 208 of FIGS. 2-4.

In some examples, the configurator 740 includes a wireless transceiver 742 for communicating on the wireless medium 716. Additionally, in some examples, the configurator 740 includes a VLC transmitter 744 (e.g., a photodiode) that is employable to communicate with the K number of network devices 704 on the network visible light communication channel 728. Furthermore, in some examples, the configurator 740 includes a VLC receiver 746 for receiving data transmitted by the VLC transmitter 717 of the network gateway 712 through a configurator visible light communication channel 750. In other examples, the configurator 740 does not have an active channel of communication with the network gateway 712. However, in any such situation, the configurator 740 is authorized by the network gateway 712 to control a portion (or all) of the device provisioning for the K number of network devices 704.

In a first example, the K number of network devices 704 are provisioned with OOB provisioning, wherein the wireless medium 716 represents a first channel of communication (or a primary band) and the network device visible light communication channel 728 represents a second communication channel (e.g., a secondary band). Accordingly, communications on the network device visible light communication channel 728 are out of band relative to communications on the wireless medium 716.

The K number of network devices 704 includes local credentials 758 stored in the controller 732. In various examples, the local credentials 758 includes a public key for the network devices 704, a certificate for the respective network devices 704 and/or a unique ID, such as a MAC address for the wireless transceiver 720, etc. The local credentials 758 are employable to uniquely identify the respective network devices 704.

In the first example, the OOB provisioning of the K number of network devices 704 employs the configurator 740 as the initiator and the network devices 704 as the responder. Moreover, the configurator 740 is configured to facilitate provisioning of the K number of network devices 704 contemporaneously. That is, the configurator 740 is configured to output data employable for provisioning the K number of network devices 704 on the network device visible light communication channel 728 that is received by the K number of network devices 704 at nearly the same time.

To provision the K number of network devices 704 for communications on the network 708 and/or to securely communicate with other devices on the wireless medium 716, the K number of network devices 704 need to be provided network credentials 748 (e.g., an ID and/or a key, such as an SSID, a certificate, a public key, a secret key and/or password for the network gateway 712) and/or provisioning credentials 762 (e.g., a URL for a service, a username and password, a public key of the service, etc.) needed to access the server 734. In the first example, to provision the K number of network devices 704, the configurator 740 and the K number of network devices 704 employ the method 500 described with respect to FIG. 4.

More particularly, in the first example, the configurator 740 provides a bootstrapping scan advertisement on the network device visible light communication channel 728. In some examples, there may be multiple instances of the bootstrapping scan advertisement. In some examples, the bootstrapping scan advertisement includes a bootstrapping key for the configurator and channel information for the network device visible light communication channel 728. In some examples, the device provisioning information includes an ID and/or a key such as SSID, a public key, a secret key and/or a certificate for the network gateway 712. In response to receipt of such information, bootstrapping of the K number network devices 704 is complete and further communications are initiated on the wireless medium 716.

In a second example, the OOB provisioning of the K number of network devices 704 employs the configurator 740 as the initiator and the network devices 704 as the responder. However, in the second example, the network gateway 712 communicates information related to bootstrap provisioning the K number of network devices 704 through the configurator visible light communication channel 750. Thus, in the second example, the wireless medium 716 represents the first channel of communication (or the primary band) and the configurator visible light communication channel 750 represents the second communication channel (e.g., the secondary band). Accordingly, communications on the configurator visible light communication channel 750 are out of band relative to communications on the wireless medium 716. Moreover, in the second example, the configurator 740 is configured to facilitate provisioning of the K number of network devices 704 contemporaneously. That is, the configurator 740 is configured to broadcast information employable for provisioning the K number of network devices 704 on the wireless medium 716 that is received by the K number of network devices 704 at nearly the same time. In the second example, the VLC receivers 724 of K number of network devices 704 are not employed, and thus can be omitted.

More particularly, in the second example, the network gateway 712 provides the configurator 740 with a bootstrapping scan advertisement on the configurator device visible light communication channel 750. In some examples, there may be multiple instances of the bootstrapping scan advertisement. In some examples, the bootstrapping scan advertisement includes a bootstrapping key for the configurator 740 and channel information for the configurator visible light communication channel. In some examples, the device provisioning information includes an ID and/or a key such as SSID, a public key, a secret key and/or a certificate for the network gateway 712. In response to receipt of such information, the configurator 740 communicates with the K number of network devices 704 through the wireless medium 716 and executes bootstrap provisioning of the K number of network devices 704. More particularly, configurator 740 provides the device provisioning information to each of the K number of network devices 704 through the wireless medium 716, Upon receipt of the device provisioning information, bootstrapping of the K number network devices 704 is complete and further communications are initiated on the wireless medium 716.

Thus, in both the first example, and the second example, communications through the wireless medium 716 include device provisioning authentication information for the K number of network devices 704. The device provisioning authentication information includes, but is not limited to an ID and/or a key of the gateway 712, such as an SSID of the network gateway 712, public key, a secret key (e.g., a symmetric key) for the network gateway 712, a certificate for the network gateway 712, etc. Moreover, in various examples, the device provisioning authentication data is provided to the network device from the network gateway 712, the configurator 740 or a combination thereof. In response to completing the provisioning, the K number of network devices 704 are employable to securely communicate with other nodes on the wireless medium 716 and or nodes on the network 708, such as the server 734 and/or the network gateway 712. More particularly, in some examples, the K number of network devices 704 are provided with secure access to the network gateway 712.

Accordingly, by implementing the system 700, multiple network devices 704 are provisioned with OOB provisioning contemporaneously. Thus, in some examples of production environments, the K number of network devices 704 are provisioned prior to deployment. For instance, in the first example, in a situation where the K number of network devices 704 represent IoT devices, the K number of network devices 704 are brought within close physical proximity to the configurator (e.g., within 3 meters) and the VLC transmitter 744 of the configurator 740 initiates the provisioning of the K number of network devices contemporaneously. Thus, after provisioning is complete, the K number of network devices 704 are fully deployable without further human interaction.

Figure 7:
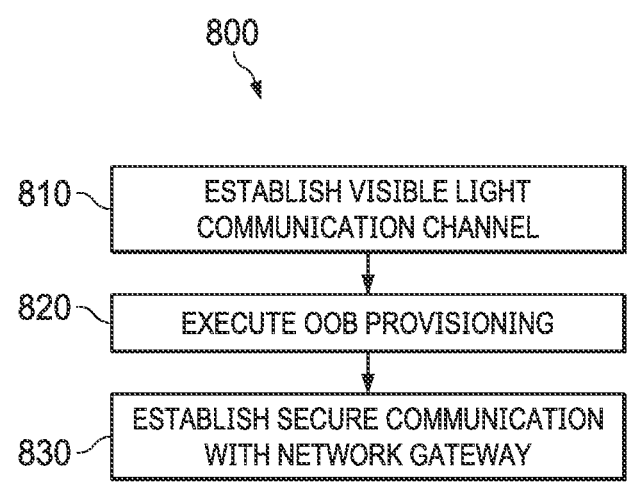
FIG. 7 illustrates a flowchart of an example method for provisioning a network device.

In view of the foregoing structural and functional features described above, example methods will be better appreciated with reference to FIG. 7. While, for purposes of simplicity of explanation, the example method of FIG. 7 is shown and described as executing serially, it is to be understood and appreciated that the present examples are not limited by the illustrated order, as some actions could in other examples occur in different orders, multiple times and/or concurrently from that shown and described herein.

Moreover, it is not necessary that all described actions be performed to implement a method. The example method of FIG. 7 can be implemented as instructions stored in a non-transitory machine-readable medium. The instructions can be accessed by a processing resource (e.g., one or more processor cores) and executed to perform the methods disclosed herein.

FIG. 7 illustrates a flowchart of an example method 800 for provisioning a network device, such as the network device 104 of FIG. 1 the network device 204 of FIGS. 2-5 and/or an instance of the network devices 704 of FIG. 6.

At 810, a visible light communication channel is established between the network device and a configurator (e.g., the configurator 140 of FIG. 1) for a network gateway (e.g., the network gateway 112 of FIG. 1). In some examples, the network device establishes the visible light communication channel, and in other examples, the configurator establishes the visible communication channel. In various examples, the visible light communication channel is unidirectional or bidirectional.

At 820, the network device and the configurator operate in concert to execute OOB provisioning of the network device for the network gateway. In such a situation, data communicated on the visible light communication channel includes data for bootstrap provisioning the network device with the network gateway using the DPP, such as the DPP authentication protocol. In some examples, some of the data transmitted for provisioning is communicated through a bidirectional wireless connection (e.g., a Wi-Fi connection) between the configurator or the network gateway and the network device. In other examples, the data transmitted for provisioning the network device is communicated through the visible light communication channel. At 830, the network device establishes secure (e.g., trusted) communication with the network gateway through a wireless transceiver of the network device based on data communicated through the visible light communication channel.

What have been described above are examples. It is, of course, not possible to describe every conceivable combination of structures, components, or methods, but one of ordinary skill in the art will recognize that many further combinations and permutations are possible. Accordingly, the disclosure is intended to embrace all such alterations, modifications, and variations that fall within the scope of this application, including the appended claims. Where the disclosure or claims recite "a," "an," "a first," or "another" element, or the equivalent thereof, it should be interpreted to include one or more than one such element, neither requiring nor excluding two or more such elements. As used herein, the term "includes" means includes but not limited to, and the term "including" means including but not limited to. The term "based on" means based at least in part on.

What is claimed is:

1. A method comprising:
providing a bootstrapping scan advertisement via a light communication channel to establish light communication between a network device and a configurator, wherein the bootstrapping scan advertisement comprises a bootstrapping key and channel information for the light communication channel;
after providing the bootstrapping scan advertisement, providing provisioning information via the light communication channel to establish wireless communication between the network device and a network gateway via a wireless communication channel based on the provisioning information.

2. The method of claim 1, wherein providing the bootstrapping scan advertisement comprises providing the bootstrapping scan advertisement by the configurator, and wherein the bootstrapping key is a bootstrapping key for the configurator.

3. The method of claim 1, wherein the light communication channel is a unidirectional light communication channel from the configurator to the network device.

4. The method of claim 1, wherein providing the provisioning information comprises providing, by the configurator, an SSID for the network gateway.

5. The method of claim 1, wherein providing the bootstrapping scan advertisement comprises providing the bootstrapping scan advertisement by the network device, and wherein the bootstrapping key is a bootstrapping key for the network device.

6. The method of claim 1, wherein the light communication channel is a unidirectional light communication channel from the network device to the configurator.

7. The method of claim 1, wherein providing the provisioning information comprises providing, by the network device, a local credential for the network device.

8. The method of claim 7, wherein the local credential comprises a media access control (MAC) address of a transceiver of the network device.

9. The method of claim 8, wherein the transceiver complies with an IEEE 802.11 standard.

10. The method of claim 1, providing enrolment information to the network gateway based on the provisioning information.

11. The method of claim 1, wherein providing the provisioning information comprises providing the provisioning information to enroll the network device in the network gateway.

12. The method of claim 1, further comprising providing a plurality of bootstrapping scan advertisements via the light communication channel, wherein each of the plurality of bootstrapping scan advertisements comprises the bootstrapping key and the channel information.

13. The method of claim 1, further comprising receiving, via the wireless communication channel, device provisioning authentication data from the network gateway.

14. The method of claim 13, wherein the device provisioning authentication data comprises a secret key for the network gateway or a certificate for the network gateway.

15. The method of claim 1, further comprising securely communicating, by the network device, with the network gateway via the wireless communication channel based on the provisioning information.

16. The method of claim 1, wherein the light communication channel is a visible light communication channel.

17. The method of claim 16, wherein the visible light communication channel complies with an IEEE 802.15.7 standard.

18. The method of claim 1, further comprising providing the bootstrapping scan advertisement via the light communication channel to a plurality of network devices.

19. The method of claim 1, wherein the network device is devoid of a user interface.

20. The method of claim 1, wherein data communicated on the light communication channel includes a portion of information related to bootstrap provisioning the network device with the network gateway using a device provisioning protocol (DPP).

* * * * *